2,951,874
MERCAPTAN PREPARATION

Calvin J. Worrel, Detroit, Mich., assignor to Ethyl Corporation, New York, N.Y., a corporation of Delaware No Drawing. Filed Mar. 31, 1958, Ser. No. 724,835

3 Claims. (Cl. 260—609)

This invention relates to, and has as its principal object, the preparation of bicyclo mercaptans.

Heretofore, the preparation of bicyclo mercaptans—e.g., bornyl mercaptan—was very difficult. Prior processes were complex, time-consuming and costly.

It has now been found that bicyclo mercaptans are prepared very readily in high yield by this invention which is a process that comprises the step of reacting a dicyclic terpene hydrocarbon, such as α-pinene, with hydrogen sulfide at a temperature in the range of about 40 to about 150° C. and at a pressure of up to about 400 p.s.i. in the initial presence of a catalytic quantity of a phosphorus sulfide such as $P_4S_{10}$ (i.e., phosphorus pentasulfide).

The following specific examples illustrate this invention. All parts are by weight.

Example I

Into a pressure reaction vessel equipped with temperature regulating and reagent introducing means were charged 272 parts (2 moles) of α-pinene, 68 parts (2 moles) of hydrogen sulfide and 4.4 parts (0.02 mole) of $P_2S_5$. The vessel was sealed and heat applied for 230 minutes. Reaction occurred at pot temperatures ranging from 60 to 139.5° C., the pressures ranging from 170 p.s.i.g. at the start of the heating to a maximum of 385 p.s.i.g. The vessel was then cooled down to room temperature and from it was recovered 296 parts of a straw-colored liquid. This product was stripped to a pot temperature of 60° C. (1.5 millimeters of mercury pressure) after which bornyl mercaptan was removed at 0.2 millimeter (pot temperature 130° C.). Analysis of bornyl mercaptan showed it to contain 18.85 percent of sulfur (theory, 19.0 percent of sulfur). Spectrophotometric analysis confirmed the structure of this mercaptan.

Example II

The procedure of Example I is repeated using in one instance β-pinene and in a second instance camphene instead of α-pinene. In both cases, the product is bornyl mercaptan.

Example III

Brought together in the reaction vessel are 136 parts (1 mole) of α-fenchene, 34 parts (1 mole) of hydrogen sulfide, and 2.3 parts (0.005 mole) of $P_4S_7$. This mixture is reacted at temperatures ranging from 40 to 150° C. for 90 minutes, the pressures ranging from 95 to 150 p.s.i.g. Formed is fenchyl mercaptan.

Example IV

The procedure of Example III is repeated with the exception that β-fenchene is used instead of α-fenchene and in one instance $P_4S_3$ and in another instance $P_4S_5$ is used in place of the $P_4S_7$. In both cases, the product is fenchyl mercaptan.

It is clear from the above examples that in the present catalytic process, the dicyclic terpene hydrocarbons undergo various internal rearrangements during their reaction with hydrogen sulfide. This surprising feature of the invention is shown by the fact that α-pinene, β-pinene and camphene each rearrange to form the bornyl radicals. Note also that the courses of these rearrangements are different from each other because each of these terpene hydrocarbons has a different chemical structure.

The fact that these surprising rearrangements occur is of considerable importance because the art has now been provided with a technically complicated but operationally simple process of making mercaptans from cheap and readily available starting materials.

The catalytic phenomena characterizing this invention are obscure. It is now known that the inorganic phosphorus sulfides bring about the desired results. However, it is not known whether these phosphorus sulfides comprise the active catalytic ingredient or whether some incidental side reactions take place leading to the formation of the active catalyst. It is believed on the basis of research on this point that a portion of the terpene hydrocarbon reacts with the phosphorus sulfide to form a very small quantity of an organic thiophosphorus acid containing at least one PSH group and that this acid is the active catalyst. It definitely appears that a neutral thiophosphorus ester does not catalyze the process of this invention. On the basis of these observations, organic thiophosphorus acids containing at least one PSH group, especially acids where the organic portion is derived from a dicyclic terpene hydrocarbon, can be used as preformed catalysts in carrying out this invention. However, from a practical standpoint, this is totally unnecessary, since irrespective of the reaction mechanisms involved, it is clear that inorganic phosphorus sulfides do the job, probably by forming the active catalyst in situ.

Included among the dicyclic terpene hydrocarbons to which this invention is applicable are α-pinene, β-pinene, camphene, α-fenchene, β-fenchene, fenchylene, bornylene, sabinene, carene, and mixtures of such materials. Most of these terpenes are readily available naval stores. Thus, when seeking to make substantially pure bicyclo mercaptans pursuant to this invention, use can be made of various commercially-available mixtures, such as terpentine, because the pinenes rearrange during the reaction to form the same end product.

The phosphorus sulfides used in the present process are $P_4S_3$, $P_4S_5$, $P_4S_7$ and $P_4S_{10}$ ($P_2S_5$). Mixtures of these and also appropriate quantities of elemental phosphorus and elemental sulfur can be used.

While temperatures in the range of 40 to 150° C. can be successfully used, it is preferable to keep the temperatures in the range of about 60 to 90° C. These latter temperatures are made possible because of the facility with which the present catalytic reaction occurs.

The amount of phosphorus sulfide catalyst used ranges from about 0.5 to about 3 mole percent based upon the amount of terpene hydrocarbon charged to the reaction vessel.

The relative amounts of terpene hydrocarbon and hydrogen sulfide are not particularly critical. One mole of each react together in the reaction and thus if excess terpene is used, the bicyclo mercaptan merely has to be separated from the excess. For best results, there should be from about 1 to about 1.2 moles of hydrogen sulfide per mole of terpene hydrocarbon. Although somewhat more hydrogen sulfide can be used, it serves no particular purpose and is thus uneconomical. Furthermore, there is the problem of excessive odor formation.

The pressures range from atmospheric to about 400 p.s.i. For optimum results, the pressure should be kept within the range of 50 to 300 p.s.i.

Introduction of the hydrogen sulfide into the reaction vessel is best accomplished by initially charging the desired amount and then carrying out the reaction. However, if desired, the hydrogen sulfide can be periodically or continuously introduced into the reaction vessel throughout the reaction period. The latter procedure results in a slower reaction rate, the times generally ranging from about 2 to about 6 hours in order to effect good yields. On the other hand, prepressurization of the reaction vessel with the requisite amount of hydrogen sulfide shortens the reaction time to form about 0.75 to 1.5 hours with no sacrifice in yields.

The bicyclo mercaptans prepared so readily by this invention are particularly useful as chemical intermediates. For example, it is known that bicyclo mercaptans, such as bornyl mercaptan, can be converted into thioethers and disulfides as shown by Ber. 39, 2352, and Gazz. Chim. Ital. 39, (ii), 208 (1909). These thioethers and disulfides are exceptionally effective cutting oil additives when dissolved in mineral lubricating oils at concentrations of about 1 to about 10 percent by weight. Excellent lubricating oil antioxidants are prepared by reacting 4 moles of these bicyclo mercaptans with one mole of $P_2S_5$ at temperatures of 100 to 120° C. followed by subsequent neutralization of the acidic reaction product with a basic inorganic compound, such as zinc oxide, barium sulfide, or the like. The resultant metallic salts when dissolved in crankcase lubricating oil at concentrations of 0.1 to 5 percent by weight impart to the base oil greatly improved oxidation resistance and reduced bearing corrosion tendencies. Generally speaking, the bicyclo mercaptans formed by the process of this invention undergo all of the chemical reactions which are applicable to secondary mercaptans.

What is claimed is:

1. Process for the preparation of bicyclo mercaptans which comprises the step of reacting a dicyclic terpene hydrocarbon with hydrogen sulfide at a temperature in the range of about 40 to about 150° C. and at a pressure of up to about 400 p.s.i. for a reaction period of 0.75 to 6 hours in the initial presence of a catalytic quantity, from about 0.5 to about 3 mole percent based on the amount of said terpene hydrocarbon, of a phosphorus sulfide, whereby said terpene hydrocarbon undergoes internal rearrangement.

2. Process for the preparation of bornyl mercaptan which comprises the step of reacting α-pinene with hydrogen sulfide at a temperature in the range of about 60 to about 90° C. and at a pressure of from about 50 to about 300 p.s.i. for a reaction period of 0.75 to 6 hours in the initial presence of a catalytic quantity, from about 0.5 to about 3 mole percent based on the amount of said terpene hydrocarbon, of phosphorus pentasulfide, whereby said terpene hydrocarbon undergoes internal rearrangement.

3. The process of claim 1 further characterized in that all of the hydrogen sulfide is charged into the reaction vessel prior to the commencement of the reaction and the reaction period ranges from about 0.75 to about 1.5 hours.

References Cited in the file of this patent

UNITED STATES PATENTS

| | | |
|---|---|---|
| 2,076,875 | Borglin et al. | Apr. 13, 1937 |
| 2,386,769 | Badertscher et al. | Oct. 16, 1945 |